United States Patent [19]

Furuta

[11] Patent Number: 4,750,752

[45] Date of Patent: Jun. 14, 1988

[54] SAFEGUARD FOR A FUEL PIPE IN AN INDUSTRIAL VEHICLE

[75] Inventor: Toshinori Furuta, Kariya, Japan

[73] Assignee: Kabushiki Kaisha Toyoda Jidoshokki Seisakusho, Kariya, Japan

[21] Appl. No.: 892,100

[22] Filed: Jul. 30, 1986

[30] Foreign Application Priority Data

Jul. 31, 1985 [JP] Japan .................. 60-117652

[51] Int. Cl.$^4$ ............................. B62D 25/00
[52] U.S. Cl. ..................... 280/152 A; 220/85 SP;
220/86 R; 280/5 A; 280/164 R; 280/169
[58] Field of Search .............. 280/5 A, 5 F, 152 A,
280/163, 164 R, 169; 296/1 C; 220/85 SP, 86
R, DIG. 33; 222/610, 540; 414/424, 634, 657,
914

[56] References Cited

U.S. PATENT DOCUMENTS

| | | | |
|---|---|---|---|
| 2,639,829 | 5/1953 | Dempster et al. | 414/424 |
| 2,711,341 | 6/1955 | Mills et al. | 280/5 A |
| 2,758,845 | 8/1956 | Doyle et al. | 280/164 R |
| 2,812,955 | 11/1957 | Urban et al. | 296/1 C |
| 3,285,359 | 11/1966 | Weeks et al. | 280/5 A |
| 4,357,027 | 11/1982 | Zeitlow | 280/5 A |
| 4,530,537 | 7/1985 | Allen et al. | 220/DIG. 23 |
| 4,700,757 | 10/1987 | Kudo | 220/86 R |

FOREIGN PATENT DOCUMENTS

| | | | |
|---|---|---|---|
| 646151 | 5/1937 | Fed. Rep. of Germany | 280/5 A |
| 6122031 | 6/1981 | Japan | 414/424 |

Primary Examiner—John J. Love
Assistant Examiner—Eric Culbreth
Attorney, Agent, or Firm—Brooks Haidt Haffner & Delahunty

[57] ABSTRACT

A safeguard of a fuel pipe for supplying fuel into a fuel tank projecting in a recess used for step in an industrial vehicle, such as a fork lift truck, which is a vehicle used for loading and unloading of vessels in a workshop. The side wall of the recess used for the step has a recessed portion where the fuel pipe projects and a projecting portion formed by bulging a part of the side wall to a position corresponding to a front end of the fuel pipe. The safeguard may further comprise a cover pivotally hinged by the side wall so as to cover the recessed portion.

3 Claims, 5 Drawing Sheets

SAFEGUARD FOR A FUEL PIPE IN AN INDUSTRIAL VEHICLE

TECHNICAL FIELD OF THE INVENTION

The present invention relates to a safegaurd for a fuel pipe in an industrial vehicle. More specifically, the present invention relates to an improvement in a structure of a step section, which is recessed in the side frame of a diesel or gasoline powered vehicle and where a fuel pipe for supplying fuel into a fuel tank projects, particularly, in an industrial vechicle, such as a fork lift truck, which is a vehicle used for loading and unloading of containers in a workshop.

PRIOR ART

Generally speaking, in an industrial vehicle, such as a fork lift truck, it is very common that a driver's seat is disposed at a high position. For example, a driver's seat is often disposed on an engine hood in a fork lift truck. When the driver's seat is disposed at such a high position, a step is formed on a side frame of the vehicle to facilitate easy stepping on and off the truck by an operator.

If such a step projects from the side frame of the vehicle, there is a risk that the step may collide with an obstacle. Accordingly, the operation efficiency of such a truck is degraded in order to avoid such a collision. Therefore, a step is often formed by recessing a part of the side frame of the industrial vehicle in order to meet with a requirement for increasing the operation efficiency. Further, in an industrial vehicle wherein an engine is installed to drive the vehicle, a fuel pipe for supplying fuel into a fuel tank is often disposed in the recess formed by the step.

PROBLEMS TO BE SOLVED BY THE INVENTION

In a structure, wherein a fuel pipe for supplying fuel into a fuel tank projects into the recess for the step, a foot of an operator may collide with the fuel pipe when the operator sets on and off the truck. Accordingly, an inconvenience may result in that the fuel pipe is damaged by the collision.

OBJECTS OF THE INVENTION

An object of the present invention is to obviate the above-described inconvenience and to enable an operator to step on and off the truck without accidentally kicking the fuel pipe.

SUMMARY OF THE INVENTION

The present invention is characterized in that a part of a side wall of a step is bulged to form a recessed portion, where a front end of a fuel pipe opens, and accordingly, a foot of an operator is prevented from directly colliding with the fuel pipe.

More specifically, a part of a side wall of a step, which is formed by recessing the side frame of the vehicle, is bulged from the side wall to form a projection. Thus, the side wall has both the projecting portion and the recessed portion.

A fuel pipe is projected into the recessed portion formed on the side wall of the step in such a manner that the front end of the fuel pipe is located on or inside of the vertical plane on which the front end of the projecting portion lies.

Since a projecting portion intervenes between a tread of the step and the fuel pipe, an operator can step on the tread without causing the collision with a fuel pipe.

BRIEF DESCRIPTION OF THE DRAWINGS

Preferred embodiments of the present invention will now be explained with reference to the accompanying drawings, wherein:

FIGS. 1, 2a and 3 illustrate a first embodiment of the present invention, wherein FIG. 1 is a side view of a fork lift truck provided with a safegaurd for a fuel pipe according to the present invention;

FIG. 2a is a perspective view of a step illustrated in FIG. 1 in an enlarged scale; and FIG. 3 is a cross sectional view of FIG. 2 in an enlarged scale;

FIGS. 4 and 5 illustrate a third embodiment of the present invention, wherein

FIG. 4 is a perspective view of a step in an enlarged scale; and

FIG. 5 is a cross sectional view of FIG. 4 in an enlarged scale; and

PREFERRED EMBODIMENTS

Figure 6:
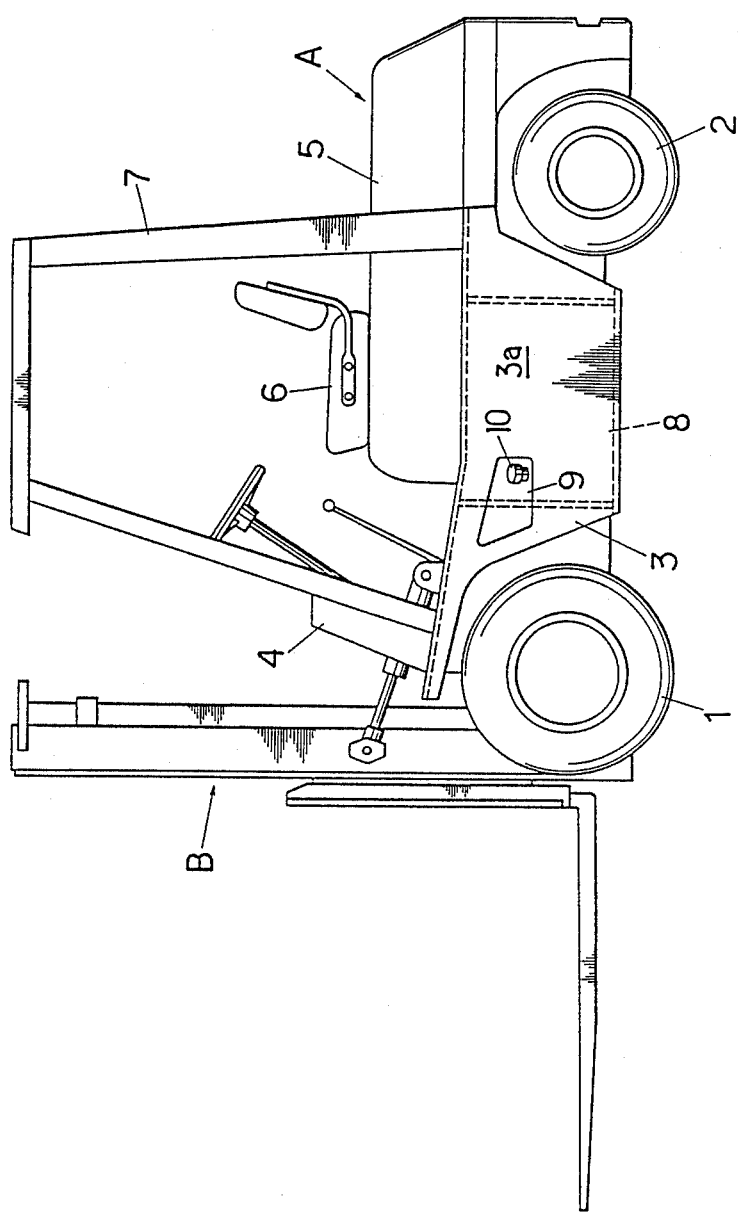
FIG. 6 is a side veiw of a fork lift truck with a conventional structure.

The drawback inherent to a conventional fork lift truck will be explained first. In such a conventional fork lift truck, as illustrated in FIG. 6, a step 9 is formed by recessing a side frame 3a, and a fuel pipe 10 for supplying fuel into a fuel tank 8 is disposed in the step 9. Thus, the fuel pipe projects into the recess for the step 9, and a foot of an operator may collide with the fuel pipe 10 when the operator gets on and off the truck. Accordingly, the fuel pipe 10 may be damaged by the collision.

The first perferred embodiments of the present invention will now be explained in detail referring to FIGS. 1, 2a and 3.

Figure 1:
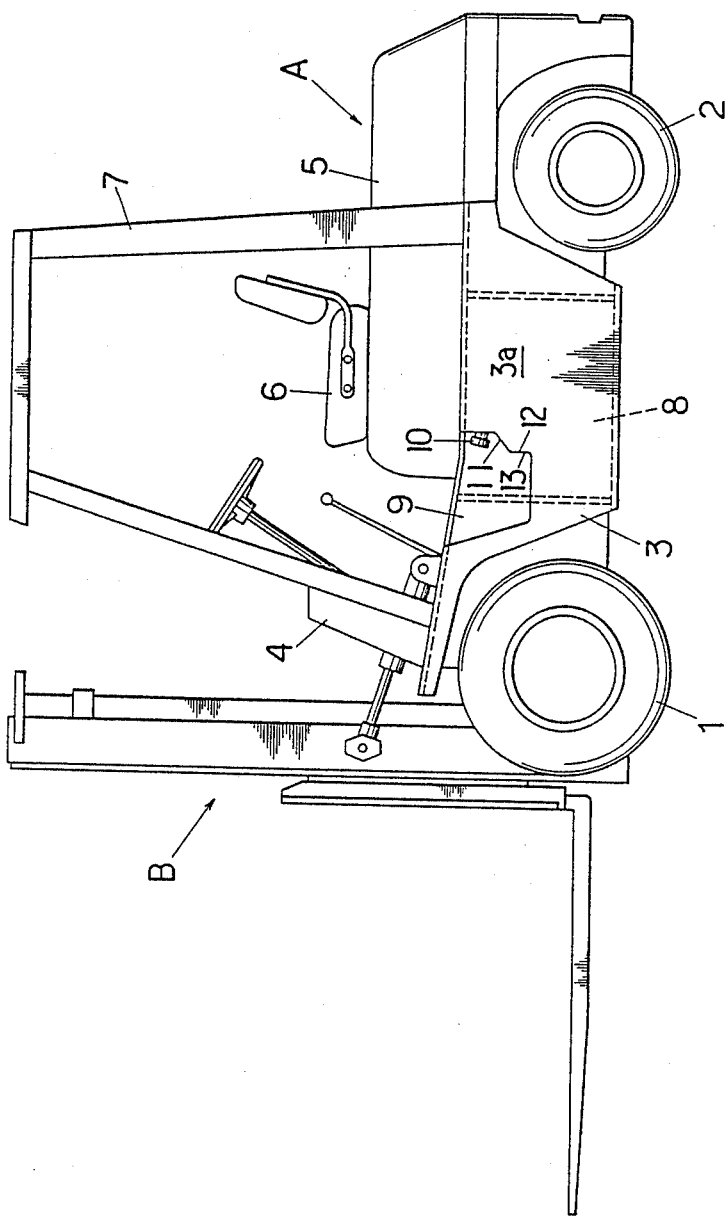

In FIG. 1, reference numeral A denotes a truck body, and B denotes a lift mechanism installed at the front end of the truck body A. The truck body A comprises front wheels 1, rear wheels 2, a machine frame 3 suspended on the front and rear wheels 1 and 2, a front protector 4, an engine hood 5, a driver's seat 6, and a head guard 7.

The machine frame 3 houses an engine, a transmission case, a clutch case (not shown) and so on between the side frames 3a. Further, a fuel tank 8 is disposed on the machine frame 3, and step 9 is formed on the outer surface of the side frame 3a by recessing them. More specifically, as illustrated in FIGS. 2a and 3, the step 9 is formed by an inner vertical recessed wall 9a, a tread 9b connected to the lower end of the inner recessed wall 9a and horizontally extending therefrom, and a pair of front and rear side walls 9c and 9d connected to the side ends of the inner recessed wall 9a as well as the the front and rear ends of the tread 9b and extending in a substantially vertical direction.

One of the side walls, i.e., the rear side wall 9d in the illustrated embodiment, of the pair of side walls 9c and 9d is constructed by using a part of the fuel tank 8, and it has a fuel pipe 10 projecting in the longitudinal direction of the vehicle and inclining in an upward direction at an upper portion thereof. More specifically, a retainer 10a is disposed at the upper portion of the side wall 9d so that it communicates with the fuel tank 8, and the retainer 10a has a cap 10b detachably inserted onto the front end thereof.

Furthermore, the lower portion of the side wall 9d is bulged towards the remaining side wall, i.e., the front side wall 9c in the illustrated embodiment, so that a projecting portion 12 is formed at the lower portion of the side wall 9d and so that a recessed portion 11 is formed around the upper portion of the side wall 9d. A guard wall portion 13 is formed on the front end of the projecting portion 12 in such a manner that the guard wall portion 13 and the front end of the fuel pipe 10 lie on substantially the same vertical plane. Accordingly, the front end of the fuel pipe 10 is protected by the guared wall portion 13.

Figure 2A:
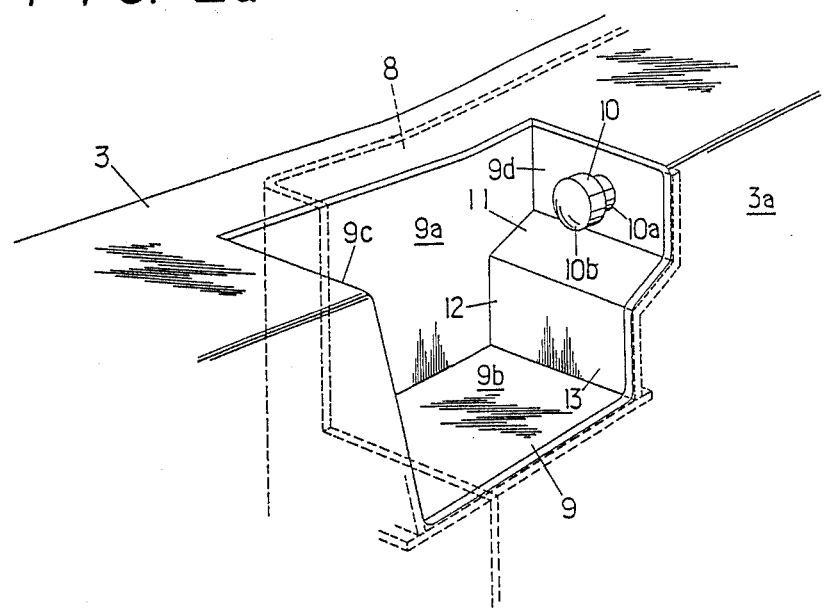
Figure 3:
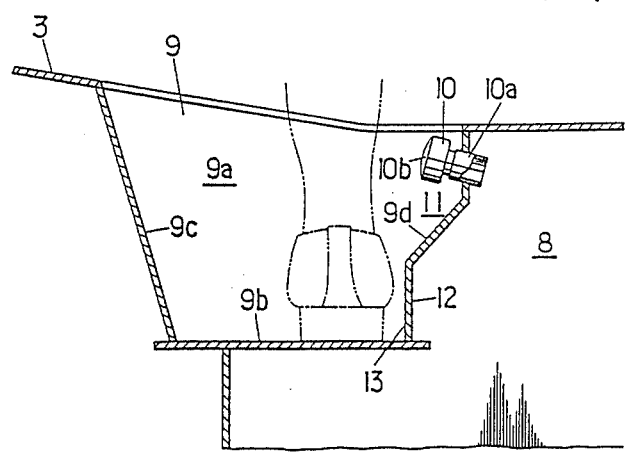
Figure 2B:
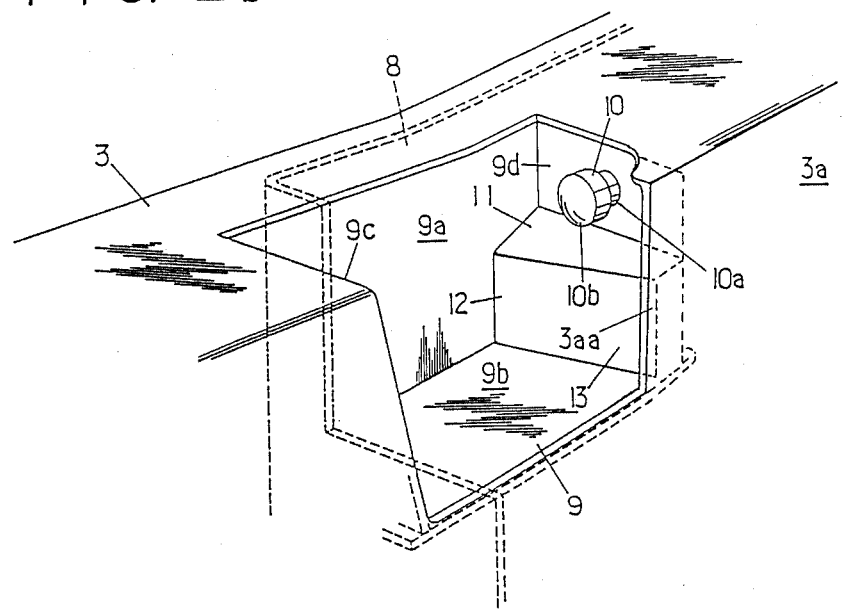
FIG. 2b is a perspective view of a step of a second embodiment.

An embodiment altered from that illustrated in FIGS. 1, 2a and 3 is illustrated in FIG. 2b. In FIG. 2b, the bulging depth of the projecting portion 12 decreases as the distance from the side frame 3a decreases so as to widen the width of the step 9 at its entrance. The end 3aa of the side frame 3a facing the step 9 extends in a forward direction of the fork lift truck over the cap 10b inserted onto the fuel pipe 10 and the guard wall 13. As a result of the extension of the end 3aa, the fuel pipe 10 and the cap 10b are protected by the extended end 3aa of the side frame 3a from an obstcle nearing them in a lateral direction. Further, aesthetic appearance of the fork lift can be enhanced by the extended end 3aa.

Figure 4:
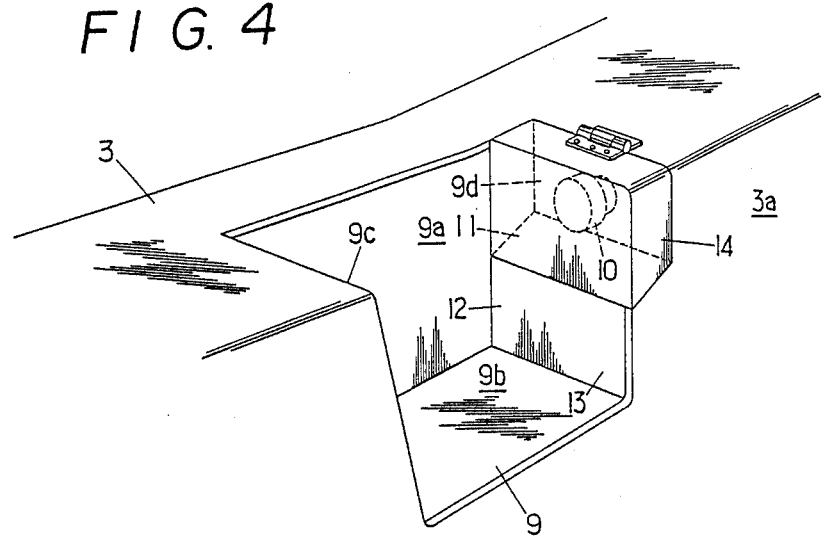
Figure 5:
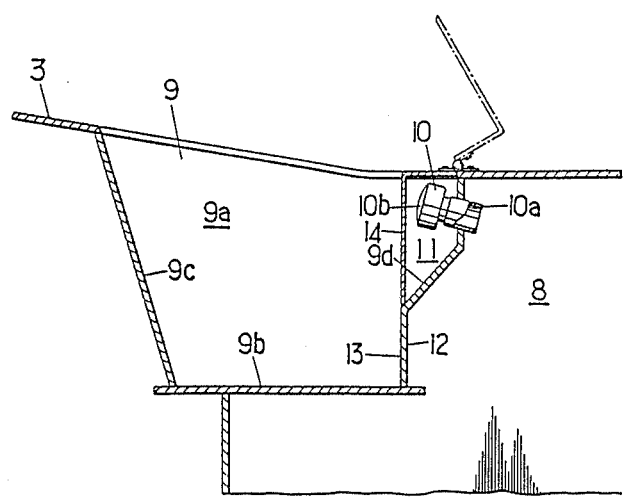

FIGS. 4 and 5 illustrate the third embodiment of the present invention, wherein a cover 14 is pivotally hinged at the upper end of the side wall 9d so that the cover 14 can cover the recessed portion 11. Since the other parts and the construction are substantially the same as those explained with reference to FIGS. 1, 2a and 3, similar parts are denoted by the same reference numerals, and their further explanation is omitted here.

ADVANTAGES ACHIEVED BY THE INVENTION

According to the present invention, which is constructed in a foregoing manner, since a fuel pipe communicating with a fuel tank is projecting from a side wall of a recessed portion for a step, and since a part of the side wall is bulged to a position corresponding to the front end of the fuel pipe, an operator can step on the tread without colliding with the fuel pipe when he or she steps on and off the truck. Accordingly, damage to the fuel pipe is effectively prevented from occurring.

What is claimed is:

1. A safeguard for a fuel pipe in an industrial vehicle having a side frame which comprises:
    a step formed by a recess in said side frame and comprising a substantially horizontal foot tread and at least one substantially vertical side wall adjacent to said tread and which faces in the longitudinal direction of the vehicle
    a fuel pipe projecting in said longitudinal direction from said one side wall at a location spaced above said tread and communicating with a fuel tank on said vehicle; and
    a projecting portion of said one side wall formed as a bulge in part of said side wall at a location adjacent to said tread and spaced below said fuel pipe, the extent of projection of said portion being at least equal to the extent of projection of said fuel pipe from said side wall thereabove, whereby said fuel pipe is safeguarded by said projecting portion from accidental colliding therewith by a foot moving on or off said tread.

2. A safeguard for a fuel pipe in an industrial vehicle according to claim 1, which further comprises a substantially vertical end extension of said side frame adjacent to said one side wall and said fuel pipe, the extent of extension of said end extension being substantially equal to that of said fuel pipe.

3. A safeguard for a fuel pipe in an industrial vehicle according to claim 1, which further comprises a cover pivotally mounted on said side wall above said fuel pipe so as to cover and uncover said fuel pipe and the portion of said side wall above said side wall projecting portion.

* * * * *